Aug. 3, 1926.

A. T. McMULLEN 1,594,892

FLYING MACHINE OR AIRPLANE

Filed July 16, 1923　2 Sheets-Sheet 1

INVENTOR
Albert T. McMullen
BY

ATTORNEY

Aug. 3, 1926.
A. T. McMULLEN
1,594,892
FLYING MACHINE OR AIRPLANE
Filed July 16, 1923    2 Sheets-Sheet 2
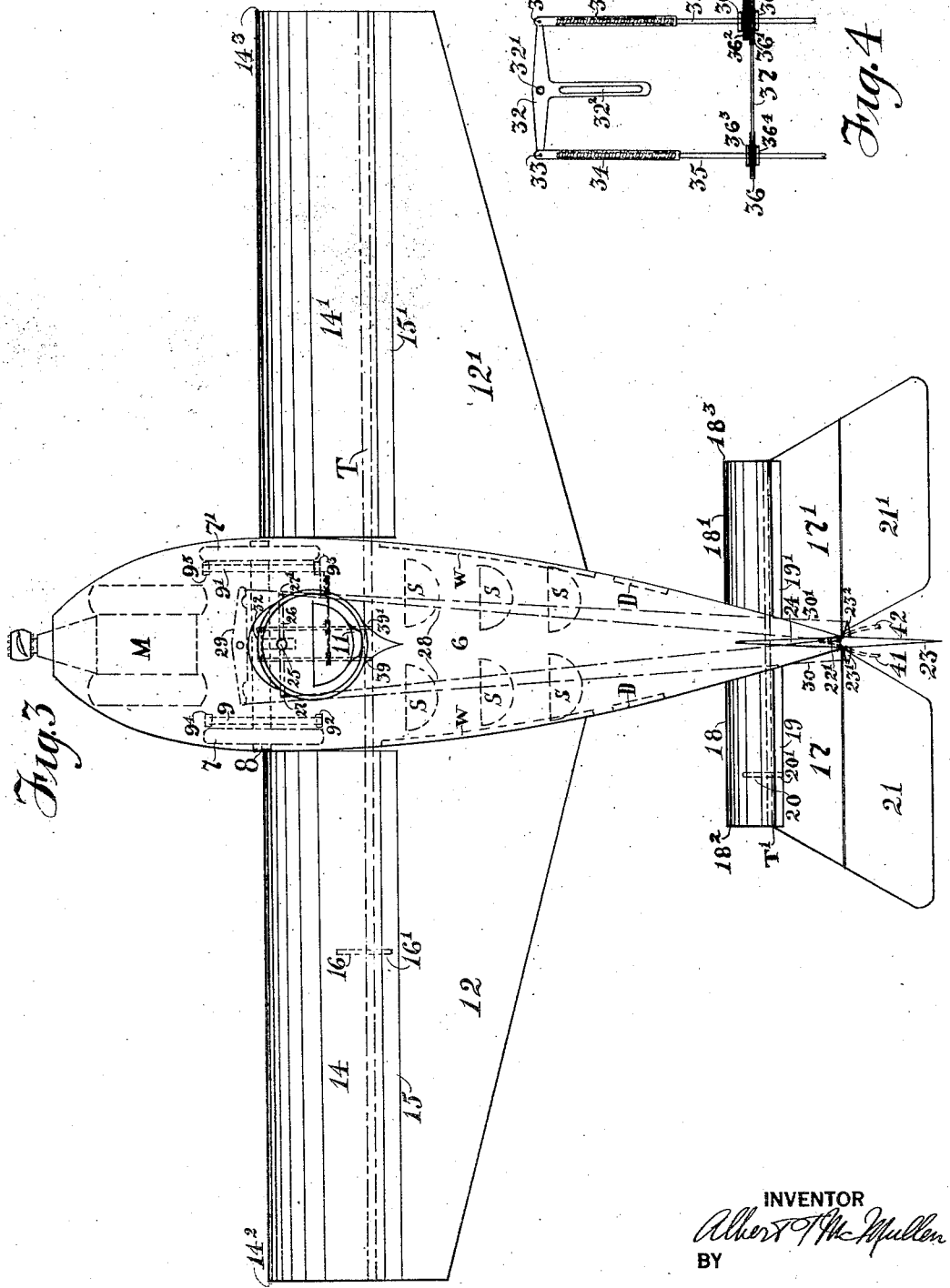
INVENTOR
Albert T. McMullen
BY
ATTORNEY Patented Aug. 3, 1926.

1,594,892

UNITED STATES PATENT OFFICE.

ALBERT T. McMULLEN, OF DETROIT, MICHIGAN.

FLYING MACHINE OR AIRPLANE.

Application filed July 16, 1923. Serial No. 651,843.

The invention relates to flying machines or airplanes, and it is the primary object of the invention to improve the general construction of airplanes to increase the flying and landing efficiency and maneuverability thereof.

It is a further object of the invention to provide improved means to control lateral balancing without the necessity of the provision of independent ailerons or by the warping of the supporting surfaces to change the angle of incidence.

It is another object of the invention to provide an airplane in which the supporting surface or surfaces are rigidly supported to extend laterally of the fuselage, or transversely of the line of flight, and to provide means whereby the thickness of the wings may be increased or decreased to increase or decrease the resistance of the wings, so as to decrease the speed of the airplane when landing, and increase the speed when in flight.

It is a further object of the invention to provide means whereby the thickness of the wings may be increased on one side of the airplane and decreased on the other side of the airplane simultaneously, to increase and decrease the lifting efficiency of the supporting surfaces at opposite sides of the airplane to control lateral stability.

The method of increasing or decreasing the thickness of the wings, as specified in the two preceding paragraphs, may also be applied to the horizontal stabilizer at the rear of the fuselage, as well as to the rudder.

When adjustable vertical plates 41—42 (Figs. 1 and 3) are used, a vertical fixed plate is used in lieu of the rudder.

It is a further object of the invention to provide improved means to support the planes without the use of trussing wire or the like and permit of the ready and quick assembling and disassembling of the same.

Other objects and advantages will hereinafter appear.

In the drawings accompanying and forming a part of this specification Fig. 1 is a side elevation of an airplane illustrating an embodiment of my invention.

Fig. 3 is a plan view.

Fig. 4 is a view of the control for moving the adjustable wing plates one up and the other down, as well as for moving both adjustable wing plates up or down simultaneously.

Similar characters of reference designate like parts throughout the different views of the drawings.

Figure 1:
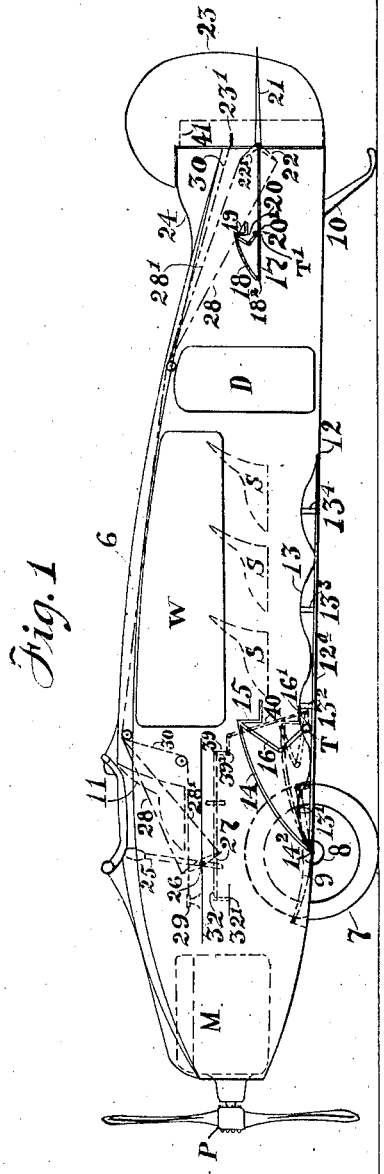
Figure 2:
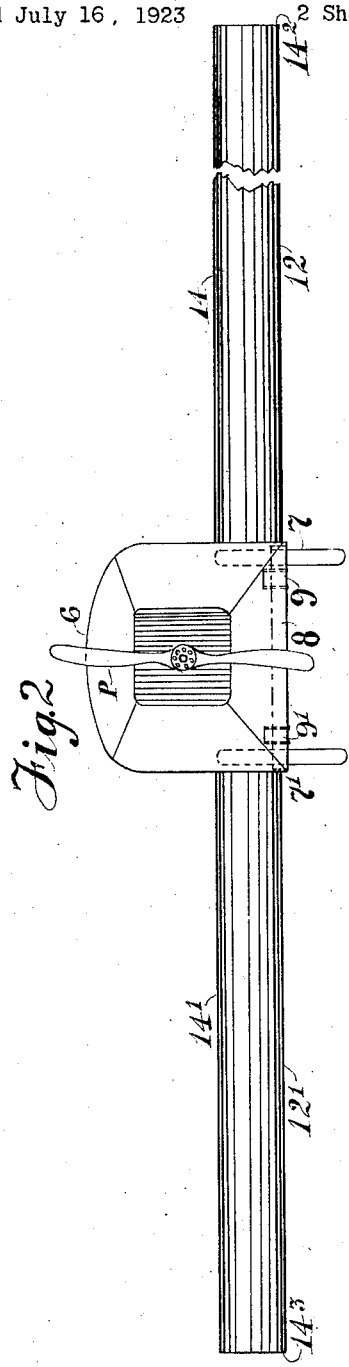
Fig. 2 is a front elevation.

The embodiment of my invention shown in the drawings comprises an elongated fuselage or body designated by 6, consisting of a framework and covering, preferably of metal, said fuselage tapering from front to rear.

Adjacent the forward end the fuselage is provided with one or more seats for the aviator or aviators as shown by 11, with the motor or powerplant M at the front end, the power shaft of which projects through the front wall of the fuselage and having a propeller P connected thereto.

An elevating surface or plane 21—21' is mounted at the rear of the fuselage to swing on a horizontal axis to control the ascending and descending movements of the airplane, and is adjusted by control wires 28—28' as is shown. To control the horizontal direction of the airplane there is provided a steering rudder 23 adjustable on a vertical axis by control wires 30—30'. Adjustable vertical plates 41—42, similar to those used on the wings, may also be provided in place of the rudder.

The fuselage is adapted to be supported upon a wheel axle 8 and steel springs 9—9' and shackles $9^2$—$9^3$ and brackets $9^4$—$9^5$. A skid 10 to engage with the ground and retard the movement of the airplane when landing is also provided at the rear of the fuselage.

The supporting surface comprises a pair of wings 12—12' to extend laterally of the fuselage and transversely to the line of flight, constructed of a lower surface $12^a$, a corrugated upper surface 13, with spars $13'$—$13^2$—$13^3$—$13^4$ placed between, said spars tapering from the inner ends to the outer ends. Biplane or multiplane surfaces may be also used within the scope of the invention.

As stated it is an object of the invention to eliminate the use of ailerons or the warping of the supporting surfaces to control lateral stability or balancing, and for this purpose the wings are provided at or near the leading edges with adjustable plates 14—14' constituting the upper cambers of the wings, which plates (connected at or near the leading edges by hinges 14²—14³) may be raised or lowered to increase or decrease the thickness of the wing, thereby increasing or decreasing the lifting efficiency of the wing. It is also an object of the invention to increase the thickness of the wing on one side and simultaneously decrease the thickness of the wing on the other side of the airplane to thereby effect lateral control of the airplane.

By raising the adjustable plates 14—14' there is provided an increased negative lift due to the rapid deflection of the air stream upwardly from the leading edges of the wings thereby creating a rarified area to the rear of the adjustable plates designated by 14—14'.

There is also provided steps 15—15' at the rear of the adjustable plates 14—14' for the purpose of preventing the formation of eddies or vortices at the rear of the adjustable plates 14—14'. This also applies to the horizontal stabilizer 17—17' at the rear of the fuselage, said steps being designated by 19—19'.

To adjust and operate the adjustable plates 14—14' there is provided a control stick 25, bell crank 32, supported on pivot 32', internally threaded tubes 34—34' pivotally connected at 33—33', externally threaded rods 35—35', sprockets 36—36'—36²—36³, chains 37—37', hand wheel 38, bell cranks 39—39', tube 40, horn 16', torque tube T, and arms or toggles 16. Only one each of toggle 16 and horn 16' is shown, but as a matter of fact a series of these may be used.

As stated it is an object of the invention to also eliminate trussing wires or the like, to rigidly support the wings to extend laterally from the fuselage, and for which purpose I provide what will be herein termed as cantilever wings. It will be obvious that by connecting the inner ends of the wings rigidly to the fuselage the said ends will be rigidly supported.

The rear skid 10 is adapted to support the airplane upon the ground in starting a flight and in alighting, at which time it serves to retard the movement of the airplane.

Variations may be resorted to within the scope of my invention, and portions of the improvements may be used without others.

Having thus described my invention, I claim:—

1. In an airplane the combination of a longitudinally extending fuselage; supporting surface or surfaces connected adjacent their inner ends to the fuselage; having a flat under surface and a longitudinally corrugated upper surface with reinforcing spars between; adjustable plates hingedly attached at or near the leading edges of the wings; substantially as and for the purpose specified.

2. In an airplane the combination of a wing or supporting surface; an adjustable plate hingeably attached at the leading edge of the wing; and a step fixed at the rear edge of the adjustable plate, substantially as shown.

3. In an airplane the combination of a wing or supporting surface; an adjustable plate hingeably attached at the leading edge of the wing; and a step fixed at the rear of the adjustable plate, to prevent the formation of eddies or vortices to the rear of the adjustable plate, substantially as and for the purpose specified.

4. In an airplane the combination of a fuselage; supporting surface or surfaces to extend laterally from the fuselage and transversely to the line of flight; a steering device consisting of a fixed vertical surface with adjustable vertical curved plates hingeably attached at the forward edge of said fixed vertical surface; an elevating surface or surfaces movable on a horizontal axis to control the upward and downward directions of the airplane; adjustable plates hingeably attached at or near the leading edges of the wings; and means to move the adjustable plates upward on one side of the airplane and simultaneously downward on the other side of the airplane, and coincidentally move the adjustable vertical curved plates to that side of the fuselage at which the wing is increased in thickness, substantially as and for the purpose specified.

5. In an airplane the combination of a fuselage; supporting surface or surfaces to extend laterally from the fuselage and transversely to the line of flight; a fixed vertical surface with adjustable vertical curved plates hingeably attached at the forward edge of said fixed vertical surface; an elevating surface or surfaces movable on a horizontal axis to control the upward and downward directions of the airplane; a horizontal stabilizer at the rear of the fuselage; adjustable plates hingeably attached at or near the leading edge of the horizontal stabilizer; and means to move the adjustable plates upward or downward to increase or decrease the thickness of the stabilizer, substantially as and for the purpose specified.

6. In an airplane the combination of a longitudinally extending fuselage; supporting surface or surfaces connected adjacent their inner ends to the fuselage; adjustable plates hingeably attached at or near the leading edges of the wings, and means to move the adjustable plates upward on one side of the airplane and simultaneously downward on the other side of the airplane, said means consisting of a control stick, a slotted bell crank engaging the lower end of the control stick, rearwardly extending tubes pivotally connected to the slotted bell crank at their forward ends, and connected to bell cranks at their rear ends, the last named bell cranks connected to downwardly projecting tubes, which tubes in turn connect to horns on laterally extending torque tubes carrying a series of arms or toggles pivotally connected to the adjustable plates on the wings, substantially as and for the purpose specified.

7. In an airplane the combination of a longitudinally extending fuselage; supporting surface or surfaces connected adjacent their inner ends to the fuselage; adjustable plates hingeably attached at or near the leading edges of the wings, and means to move the adjustable plates simultaneously upward or downward on both sides of the airplane, and hold them in fixed position, said means consisting of a hand wheel and chains which operate sprockets slidably mounted on rods of square section adjacent to the point of connection of said sprockets, the forward ends of said rods threaded into tubes pivotally connected to a bell crank at their forward ends, the square section rods extending rearwardly to bell cranks, the last named bell cranks connected to downwardly projecting tubes, which tubes in turn connect to horns on laterally extending torque tubes carrying a series of arms or toggles pivotally connected to the adjustable plates on the wings, substantially as and for the purpose specified.

ALBERT T. McMULLEN.